(12) United States Patent
Persson et al.

(10) Patent No.: US 11,930,420 B1
(45) Date of Patent: Mar. 12, 2024

(54) HANDHELD ELECTRONIC DEVICES WITH CONTEXTUAL INPUT-OUTPUT CAPABILITIES

(71) Applicant: Apple Inc., Cupertino, CA (US)

(72) Inventors: Per Haakan Linus Persson, San Francisco, CA (US); Seung Wook Kim, San Jose, CA (US); William D. Lindmeier, San Francisco, CA (US); Paul G. Puskarich, London (GB); Peter C. Tsoi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 17/402,364

(22) Filed: Aug. 13, 2021

Related U.S. Application Data

(60) Provisional application No. 63/078,700, filed on Sep. 15, 2020.

(51) Int. Cl.
*H04W 4/02* (2018.01)
*G02B 27/01* (2006.01)
*G10L 15/22* (2006.01)
*H04M 1/72457* (2021.01)

(52) U.S. Cl.
CPC ............. *H04W 4/02* (2013.01); *G02B 27/01* (2013.01); *G10L 15/22* (2013.01); *H04M 1/72457* (2021.01); *H04M 2201/40* (2013.01)

(58) Field of Classification Search
None
See application file for complete search history.

(56) References Cited

U.S. PATENT DOCUMENTS

| | | | |
|---|---|---|---|
| 9,210,413 B2 | 12/2015 | Grinberg et al. | |
| 9,245,442 B2 | 1/2016 | Belz et al. | |
| 9,355,557 B2 | 5/2016 | Hong et al. | |
| 9,837,081 B2 | 12/2017 | Kannan et al. | |
| 10,083,544 B2 | 9/2018 | Chen et al. | |
| 10,930,277 B2 | 2/2021 | David et al. | |
| 2015/0049591 A1* | 2/2015 | Adams | G04G 21/04 368/239 |
| 2015/0098309 A1* | 4/2015 | Adams | G04F 10/00 368/10 |

(Continued)

*Primary Examiner* — Quynh H Nguyen
(74) *Attorney, Agent, or Firm* — Treyz Law Group, P.C.; Kendall P. Woodruff

(57) ABSTRACT

A handheld electronic device may include a microphone for receiving voice commands, a speaker for providing audio feedback, a display for providing visual output and receiving touch input, and a motion sensor for receiving gesture input. The handheld electronic device may include control circuitry that processes voice commands differently depending on the application running on the handheld electronic device and the icon being displayed on the display. The control circuitry may determine the location of the handheld electronic device and may provide content based on the location. For example, a remote control interface for controlling an external device may be displayed when the handheld electronic device approaches the external device. A head-mounted device may display virtual images based on the location of the handheld electronic device. The virtual images may include a live video feed from a video call, virtual images associated with voice commands, or other virtual images.

16 Claims, 12 Drawing Sheets

(56) References Cited

U.S. PATENT DOCUMENTS

| | | | |
|---|---|---|---|
| 2015/0373663 A1* | 12/2015 | Bao | G01S 5/02521 |
| | | | 455/456.6 |
| 2015/0378548 A1* | 12/2015 | Wan | G06F 1/1643 |
| | | | 345/173 |
| 2018/0088222 A1* | 3/2018 | Anholt | G01S 13/08 |
| 2019/0246075 A1 | 8/2019 | Khadloya et al. | |
| 2022/0277254 A1* | 9/2022 | Feeney | G08B 21/02 |

* cited by examiner

HANDHELD ELECTRONIC DEVICES WITH CONTEXTUAL INPUT-OUTPUT CAPABILITIES

This application claims the benefit of provisional patent application No. 63/078,700, filed Sep. 15, 2020, which is hereby incorporated by reference herein in its entirety.

FIELD

This relates generally to electronic devices, and, more particularly, to handheld electronic devices.

BACKGROUND

Electronic devices such as cellular telephones and voice-controlled assistant devices may be used to gather user input and provide a user with output.

It can be cumbersome to interact with electronic devices. For example, electronic devices may be bulky and awkward to handle or may have complicated user interfaces that require the user to take multiple actions in order to perform desired functions.

SUMMARY

A handheld electronic device may include a microphone for receiving voice commands, a speaker for providing audio feedback, a display for providing visual output and receiving touch input, and a motion sensor for receiving gesture input. The handheld electronic device may include control circuitry that processes voice commands differently depending on what application is running on the handheld electronic device and which icon is being displayed on the display.

The control circuitry may determine the location of the handheld electronic device and may automatically provide content based on the location. For example, a remote control interface for controlling an external device may be automatically displayed when the handheld electronic device approaches the external device, or audio content associated with a museum or other location may automatically be provided when the user arrives at the museum or other location.

A head-mounted device may display virtual images based on the location of the handheld electronic device. The virtual images may include a live video feed from a video call, a virtual control interface, virtual images associated with voice commands, or other virtual images.

DETAILED DESCRIPTION

Electronic devices that are configured to be held in the hand of a user may be used to gather user input and to provide a user with output. For example, a handheld electronic device may have a small, touch-sensitive display for gathering touch input and providing visual output, one or more microphones for gathering voice input, one or more speakers for providing audio output, and location tracking circuitry for tracking the location of the handheld electronic and/or for tracking the location of external electronic devices. If desired, the handheld electronic device may include haptic output devices for providing haptic output to a user.

The handheld electronic device may serve as a voice-controlled assistant, may serve as a stand-alone electronic device running one or more software applications (e.g., a weather application, a music streaming application, a calculator application, a calendar application, a payment application, etc.), may serve as a remote control for household items such as speakers, lights, kitchen appliances, etc., may serve as an anchor or visual marker in an augmented reality or virtual reality system, may serve as an accessory device for gathering input and/or providing output associated with an external electronic device such as a pair of headphones, a loudspeaker, a cellular telephone, a tablet computer, a laptop computer, a head-mounted device, etc., and/or may be used for other functions.

Due to its small size (e.g., smaller than a user's palm, the size of a pebble or stone, the size of coin, or other suitable size) and selective input-output capabilities, the handheld electronic device may be used for focused, contextual applications. If desired, the handheld electronic device may be used for one application at a time (e.g., a calculator application, a remote control application, a music application, a weather application, a news application, etc.). Voice commands received by the handheld electronic device may be processed differently depending on the application being used (e.g., control circuitry may listen for calculator-related voice commands when the handheld electronic device is operated in calculator mode, may listen for music-related voice commands when the handheld electronic device is operated in music mode, may listen for weather-related commands when the handheld electronic device is operated in weather mode, etc.). The mode or application may be set or adjusted based on user input (e.g., voice commands, touch input, etc.), sensor data, and/or location. For example, the handheld electronic device may automatically launch into remote control mode when approaching an external electronic device, may automatically launch into contactless payment mode when approaching a payment terminal, may automatically launch into a museum application when entering a museum, etc.

Figure 1:
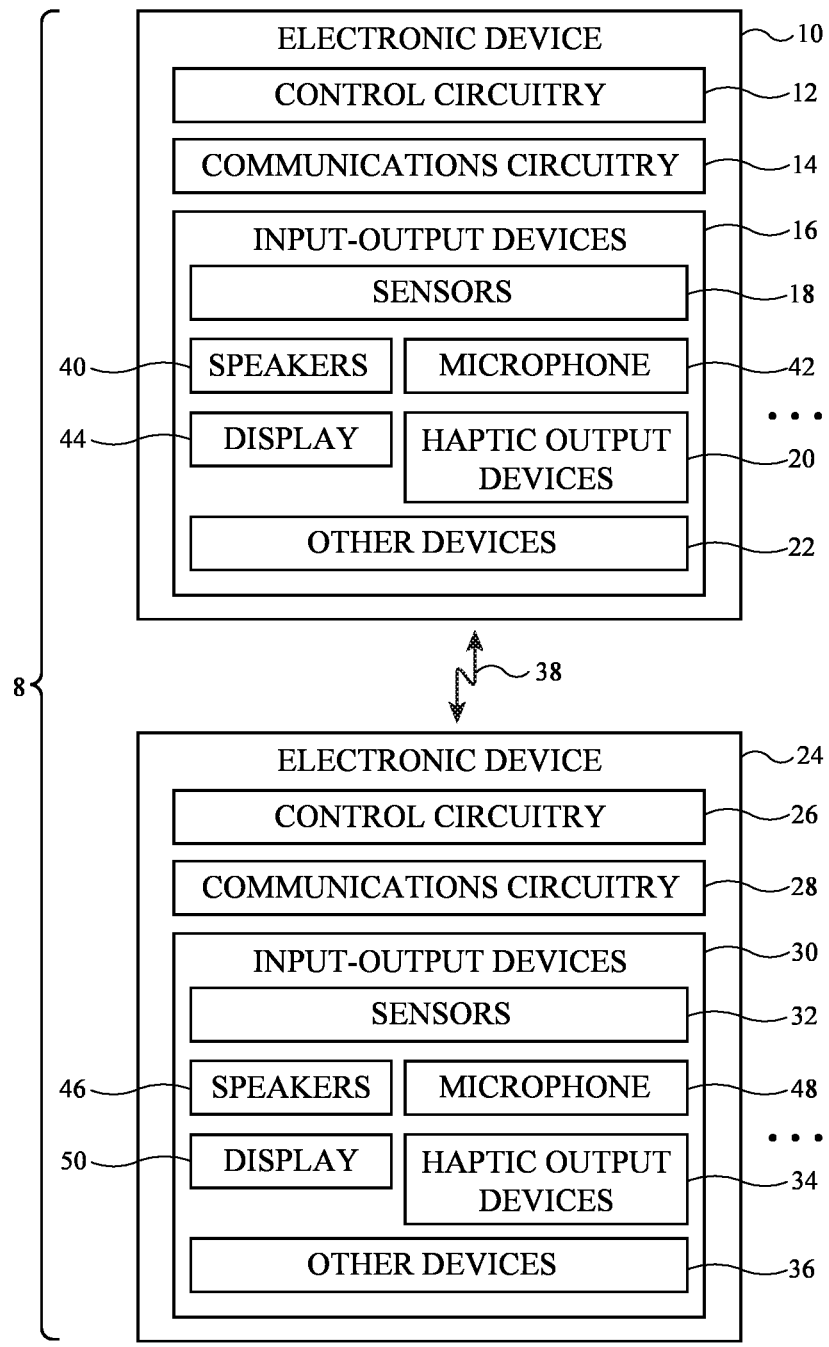
FIG. 1 is a schematic diagram of an illustrative system with a handheld electronic device in accordance with an embodiment.

FIG. 1 is a schematic diagram of an illustrative system of the type that may include one or more handheld electronic devices. As shown in FIG. 1, system 8 may include electronic device(s) such as electronic device(s) 10 and other electronic device(s) 24. Each electronic device 10 may be small enough to fit in a user's hand. Additional electronic devices in system 8 such as devices 24 may include devices such as a laptop computer, a computer monitor containing an embedded computer, a tablet computer, a desktop computer (e.g., a display on a stand with an integrated computer processor and other computer circuitry), a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, device 10 is a small handheld device having a housing that sits comfortably in a user's hand and device(s) 24 is a cellular telephone, tablet computer, laptop computer, wristwatch device, head-mounted device, a device with a speaker (e.g., a pair of earbuds or other headphones, a loud speaker, a voice-controlled assistant speaker device, etc.), and/or other electronic device (e.g., a device with a display, audio components, and/or other output components, equipment that includes multiple devices such as a cellular telephone or computer that serves as a host and a head-mounted device that provides display functionality for the host, etc.).

Devices 10 and 24 may include control circuitry 12 and 26. Control circuitry 12 and 26 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 26 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 14 and/or control circuitry 26 may communicate using communications circuitry 28. Circuitry 14 and/or 28 may include antennas, radio-frequency transceiver circuitry, and other wireless communications circuitry and/or wired communications circuitry. Circuitry 14 and/or 28, which may sometimes be referred to as control circuitry and/or control and communications circuitry, may, for example, support bidirectional wireless communications between devices 10 and 24 over wireless link 38 (e.g., a wireless local area network link, a near-field communications link, a Bluetooth® link, a WiFi® link, a 60 GHz link or other millimeter wave link, other suitable wired or wireless communications link, etc.). Devices 10 and 24 may also include power circuits for transmitting and/or receiving wired and/or wireless power and may include batteries. In configurations in which wireless power transfer is supported between devices 10 and 24, in-band wireless communications may be supported using inductive power transfer coils (as an example).

Communications circuitry 14 and/or 28 may include wireless communication circuitry such as one or more antennas and associated radio-frequency transceiver circuitry. The transceiver circuitry in circuitry 14 and/or 28 may include wireless local area network transceiver circuitry (e.g., WiFi® circuitry), Bluetooth® circuitry, cellular telephone transceiver circuitry, ultra-wideband communications transceiver circuitry, millimeter wave transceiver circuitry, near-field communications circuitry, satellite navigation system circuitry such as Global Positioning System (GPS) receiver circuitry (e.g., for receiving GPS signals at 1575 MHz or for handling other satellite positioning data), and/or wireless circuitry that transmits and/or receives signals using light (e.g., with light-emitting diodes, lasers, or other light sources and corresponding light detectors such as photodetectors). Antennas in circuitry 14 and/or 28 may include monopole antennas, dipole antennas, patch antennas, inverted-F antennas, loop antennas, slot antennas, other antennas, and/or antennas that include antenna resonating elements of more than one type (e.g., hybrid slot-inverted-F antennas, etc.). Antennas may be formed from metal traces on printed circuits or other substrates, may include stamped metal parts, may include metal structures that form part of an enclosure or other supporting structure for devices 10 and/or 24, and/or other conductive structures.

Communications signals 38 (e.g., Bluetooth® signals, near-field communications signals, wireless local area signals such as IEEE 802.11 signals, millimeter wave communication signals such as signals at 60 GHz, ultra-wideband radio frequency signals, other radio-frequency wireless signals, infrared signals, etc.) may be used to convey location and orientation information. For example, control circuitry 12 in electronic device 10 may determine the location of device 24 and/or control circuitry 26 in device 24 may determine the location of device 10 using wireless signals 38 (e.g., using signal strength measurement schemes, using time based measurement schemes such as time of flight measurement techniques, time difference of arrival measurement techniques, angle of arrival measurement techniques, triangulation methods, time-of-flight methods, using a crowdsourced location database, other suitable measurement techniques, etc.).

Devices 10 and 24 may include input-output devices such as devices 16 and 30. Input-output devices 16 and/or 30 may be used in gathering user input, in gathering information on the environment surrounding the user, and/or in providing a user with output. Devices 16 may include sensors 18 and devices 30 may include sensors 32. Sensors 18 and/or 32 may include force sensors (e.g., strain gauges, capacitive force sensors, resistive force sensors, etc.), audio sensors such as microphones, touch and/or proximity sensors such as capacitive sensors (e.g., two-dimensional touch sensors), optical sensors such as optical sensors that emit and detect light, ultrasonic sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as sensors for measuring blood oxygen content and heart rates sensors, radio-frequency sensors (e.g., sensors that gather position information, three-dimensional radio-frequency images, and/or other information using radar principals or other radio-frequency sensing, sensors that detect position, orientation, and/or motion relative to other objects using Bluetooth® positioning techniques or using ultra-wideband positioning techniques), muscle activity sensors (EMG) for detecting finger actions, optical sensors such as self-mixing sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors, gas sensors, and/or other sensors. In some arrangements, devices 10 and/or 24 may use sensors 18 and/or 32 and/or other input-output devices 16 and/or 30 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.). If desired, device 10 and/or device 24 may include rotating buttons (e.g., a crown mechanism on a watch or finger device or other suitable rotary button that rotates and that optionally can be depressed to select items of interest). Alphanumeric keys and/or other buttons may be included in devices 16 and/or 30.

Devices 16 and/or 30 may include audio components such as microphone 42 and/or microphone 48. Microphones 42 and/or 48 may include microphones for gathering voice command input, microphones that measure ambient noise as part of a noise cancellation system, microphones in echo-location sensors, etc.). Audio components in devices 16 and/or 30 may also include one or more speakers 40 and/or 46 (e.g., tweeters, midrange speakers, woofers, subwoofers, etc.).

Devices 16 and/or 30 may include one or more visual output devices such as display 44 and/or display 50. Displays 44 and/or 50 may be touch screen displays that incorporate a layer of conductive capacitive touch sensor electrodes or other touch sensor components (e.g., resistive touch sensor components, acoustic touch sensor components, force-based touch sensor components, light-based touch sensor components, etc.) or may be displays that are not touch-sensitive. Capacitive touch screen electrodes may be formed from an array of indium tin oxide pads or other transparent conductive structures.

Displays 44 and/or 50 may include an array of pixels formed from liquid crystal display (LCD) components, an array of electrophoretic pixels, an array of plasma pixels, an array of organic light-emitting diode pixels, an array of electrowetting pixels, or pixels based on other display technologies.

Devices 16 and/or 30 may include haptic output devices 20 and/or 34. Haptic output devices 20 and/or 34 can produce motion that is sensed by the user (e.g., through the user's hands). Haptic output devices 20 and/or 34 may include actuators such as electromagnetic actuators, motors, piezoelectric actuators, electroactive polymer actuators, vibrators, linear actuators, rotational actuators, actuators that bend bendable members, actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24). In some situations, actuators for creating forces in device 10 may be used to provide haptic output to a user's skin. In other situations, these components may be used to interact with each other (e.g., by creating a dynamically adjustable electromagnetic repulsion and/or attraction force between a pair of devices 10 and/or between device(s) 10 and device(s) 24 using electromagnets).

If desired, input-output devices 16 and/or 30 may include other devices 22 and/or 36 such as status indicator lights (e.g., a light-emitting diode in device 10 and/or 24 that serves as a power indicator, and other light-based output devices), electromagnets, permanent magnets, structures formed from magnetic material (e.g., iron bars or other ferromagnetic members that are attracted to magnets such as electromagnets and/or permanent magnets), batteries, etc. Devices 10 and/or 24 may also include power transmitting and/or receiving circuits configured to transmit and/or receive wired and/or wireless power signals (e.g., wireless power transmitting coils and wireless power receiving coils, capacitive electrodes for wireless power transmission and/or wireless power reception, etc.).

If desired, electronic devices 24 may serve as host devices that run software that is used to track the location of devices 10, send control signals to devices 10, receive data from devices 10, and/or perform other functions related to the operation of devices 10. This is, however, merely illustrative. If desired, electronic device 10 may operate as a stand-alone device.

Figure 2:
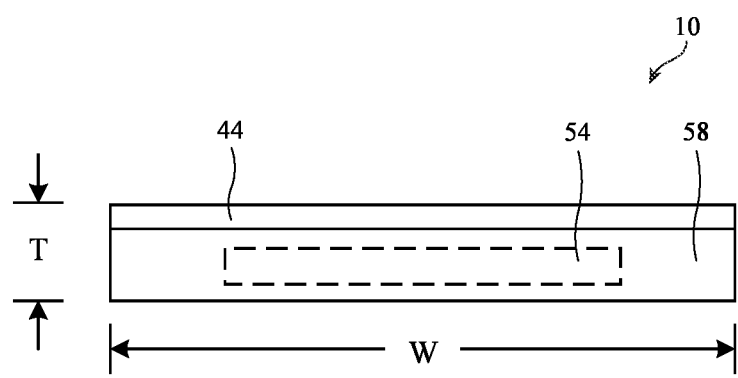
FIG. 2 is a cross-sectional side view of an illustrative handheld electronic device in accordance with an embodiment.

FIG. 2 is a side view of an illustrative handheld electronic device 10. As shown in FIG. 2, device 10 includes a housing such as housing 58. Housing 58, which may sometimes be referred to as an enclosure or case, may be formed of plastic, glass, ceramics, fiber composites, metal (e.g., stainless steel, aluminum, etc.), fabric, leather, other suitable materials, or a combination of any two or more of these materials. Housing 58 may be formed using a unibody configuration in which some or all of housing 58 is machined or molded as a single structure or may be formed using multiple structures (e.g., an internal frame structure, one or more structures that form exterior housing surfaces, etc.). Housing 58 may be rigid, may be soft and flexible, or may have rigid and flexible portions.

Device 10 may include electrical components 54 mounted in housing 58. Electrical components 54 may include circuitry of the type described in connection with FIG. 1 (e.g., control circuitry 12, communications circuitry 14, input-output devices 16, and/or other electrical components). Electrical components 54 may include integrated circuits, discrete components, and/or other circuits and may, if desired, be interconnected using signal paths in one or more printed circuits. If desired, one or more portions of housing 58 may be transparent to light, radio-frequency waves, and/or sound (e.g., so that light associated with a light-emitting or light-detecting component can pass through housing 58, so that radio-frequency signals can pass through housing 58, so that sound from a speaker in device 10 can exit housing 58, so that sound from outside of device 10 can reach a microphone in device 10, etc.).

Electrical components 54 may include a low-power transmitter (e.g., a Bluetooth® Low Energy transmitter, an ultra-wideband radio-frequency signal transmitter, an RFID transmitter, a near-field communications transmitter, and/or other transmitter) that transmits signals (e.g., signals 38 of FIG. 1). Device 24 may have a corresponding receiver (e.g., an ultra-wideband signal receiver) that detects the transmitted signals from device 10, and control circuitry 26 may determine the location of (and/or other information about) device 10 based on the received signals. In some arrangements, device 10 may not include an internal power source and may instead be powered by electromagnetic energy (e.g., radio frequency waves) from device 24 or other device. In other arrangements, device 10 may include an internal power source.

Device 10 may have a circular shape, a round shape, an oval shape, a rectangular shape, a pebble or rock shape, a cube shape, and/or other suitable shape. Device 10 may have a lateral dimension D between 25 mm and 50 mm, between 50 mm and 100 mm, between 10 mm and 200 mm, between 5 mm and 75 mm, less than 50 mm, or greater than 50 mm, and may have a thickness T between 0.1 mm and 1 mm, between 0.5 mm and 2 mm, between 1 mm and 2 mm, between 0.1 mm and 5 mm, greater than 5 mm, or less than 5 mm. The form factor of FIG. 2 is merely illustrative. Display 44 may be mounted in housing 58. Display 44 may be round (e.g., circular, oval, etc.), may be rectangular, or may have other suitable shapes.

If desired, device 10 may include an attachment structure for coupling device 10 to an item such as an external surface, a user's body or clothing, or other item. For example, device 10 may include an attachment structure such as adhesive (e.g., a semi-permanent adhesive, a skin-safe adhesive, etc.), magnets, clips, hooks, a strap or other band, and/or other structures for attaching device 10 to an item.

Devices such as device 10 of FIG. 2 may use input-output devices 16 in components 54 to gather input and provide output. As an example, device 10 may use microphone 42 to gather voice commands, may use speakers 40 to provide audio feedback and/or other audio output, may use display 44 to provide visual output (e.g., to display an icon corresponding to the current application being used on device 10, to display text, graphics, and/or video, to provide status light indicator output, etc.), may use haptic output devices 20 to provide haptic feedback and/or other haptic output to a user, may use motion sensor(s) such as accelerometers to gather motion data and gesture input (e.g., gestures made by a user by moving device 10 around in space or on a surface), tap input, etc., may use location tracking circuitry to track the location of device 10 (e.g., distance and orientation relative to another electronic device such as electronic device 24 or geographic location such as geographic coordinates) and/or to track the location of external electronic devices such as device 24, etc. Location data, intentional user input (e.g., button press input, user input on force sensors, touch sensors, and/or other input devices, voice commands gathered with microphone 42, gesture input, tap input, squeeze input, etc.), environmental readings, and/or other information on the user and the user's surroundings may be gathered by devices 16 and processed by control circuitry 12.

In some configurations, device 10 may be used in isolation (e.g., as a stand-alone device with input and output capabilities). In other configurations, device 10 may operate in conjunction with external equipment (e.g., devices 24 of FIG. 1). As an example, device 10 may gather user input, location data, and/or other information using input-output devices 16 and may provide this information and/or other information to device 24 via a wired or wireless communications path (e.g., wireless link 38 of FIG. 1). Device 24 can process this data and can take suitable action (e.g., using input-output devices 30 to provide output to a user and/or by directing device 10 to provide output to the user using input-output circuitry 16 of device 10).

Figure 3:
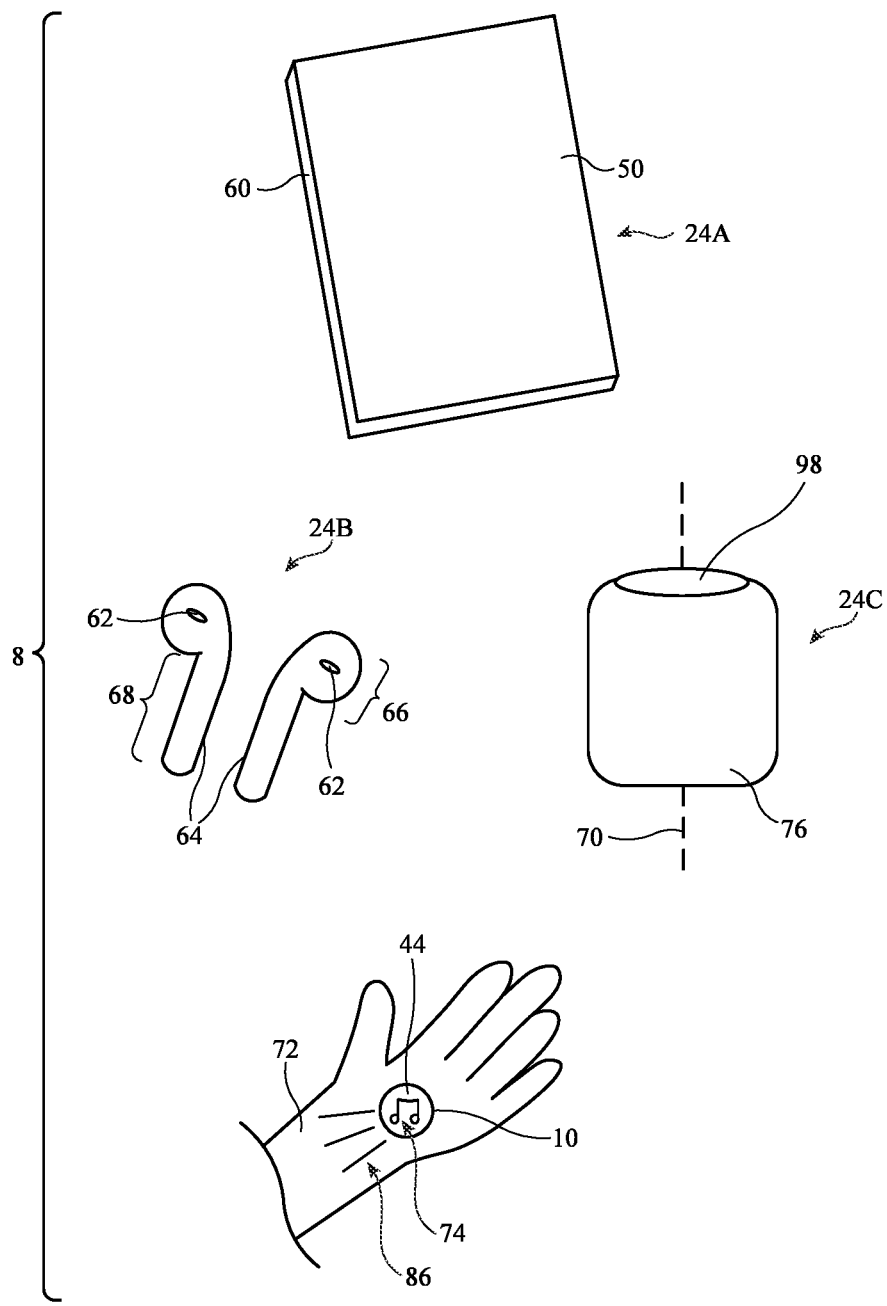
FIG. 3 is a diagram of an illustrative system with a handheld electronic device that may be used in conjunction with one or more external electronic devices.

FIG. 3 is a diagram of illustrative electronic devices 24 that may be used in conjunction with handheld electronic device 10.

Electronic device 24A may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, internet-supplying networking equipment such as a router, a wireless access point, a server, a modem, a base station, equipment that implements the functionality of two or more of these devices, or other electronic equipment. In the illustrative configuration of FIG. 3, device 24A is a portable device such as a cellular telephone, a wristwatch device, media player, tablet computer, or other portable computing device. Other configurations may be used for device 24A if desired. The example of FIG. 3 is merely illustrative.

As shown in FIG. 3, device 24A may include a display such as display 50. Display 50 may be mounted in a housing such as housing 60. For example, device 24A may have opposing front and rear faces and display 50 may be mounted in housing 60 so that display 50 covers the front face of device 24A as shown in FIG. 3. Housing 60, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 60 may be formed using a unibody configuration in which some or all of housing 60 is machined or molded as a single structure or may be formed using multiple structures (e.g., an internal frame structure, one or more structures that form exterior housing surfaces, etc.). If desired, different portions of housing 60 may be formed from different materials. For example, housing sidewalls may be formed from metal and some or all of the rear wall of housing 60 may be formed from a dielectric such as plastic, glass, ceramic, sapphire, etc. Dielectric rear housing wall materials such as these may, if desired, by laminated with metal plates and/or other metal structures to enhance the strength of the rear housing wall (as an example).

Display 50 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 50 may include an array of pixels formed from liquid crystal display (LCD) components, an array of electrophoretic pixels, an array of plasma pixels, an array of organic light-emitting diode pixels, an array of electrowetting pixels, or pixels based on other display technologies.

Display 50 may be protected using a display cover layer such as a layer of transparent glass, clear plastic, sapphire, or other transparent dielectric. Openings may be formed in the display cover layer. For example, an opening may be formed in the display cover layer to accommodate a button. Buttons may also be formed from capacitive touch sensors, light-based touch sensors, or other structures that can operate through the display cover layer without forming an opening.

Personal speakers in system 8 such as personal speakers 24B may be speakers that play audio directly to a user's ears (e.g., one or more earbuds, in-ear headphones, over-the-ear headphones, wired or wireless headphones, other suitable earphones, etc.).

Personal speaker device 24B may have a housing such as housing 64. Housing 64 may have one or more housing walls formed from polymer, glass, ceramic, metal, other materials, and/or combinations of these materials. The inner surfaces of the housing wall forming housing 64 may have planar portions and/or curved portions. In the illustrative configuration of FIG. 3, personal speaker device 24B is a pair of earbuds (e.g., a left earbud and a right earbud), and housing 64 has the shape of an earbud. This is merely illustrative. Housing 64 may have other shapes, if desired (e.g., left and right ear cups coupled by a head band, left and right earbuds coupled by a wire, etc.).

Openings may be formed in housing 64. For example, housing 64 may include speaker port opening 62 to allow sound that is produced by a speaker in housing 64 to exit housing 64. Housing 64 (and earbuds 24B) may have an ear portion such as ear portion 66 configured to be received within the ear of a user and may have a stalk portion such as elongated stalk portion 68 (sometimes referred to as an out-of-ear portion) that is configured to protrude away from ear portion 66 and out of the user's ear. A user may hold stalk portion 68 when placing ear portion 66 into the user's ear. Earbuds 24B may include sensing circuitry (e.g., capacitive sensors, optical sensors, motion sensors such as accelerometers, and/or other sensors) for detecting finger touch gestures (e.g., swipes, taps, double taps, presses, etc.) on stalk portion 68 and/or on ear portion 66.

System 8 may include other devices with speakers such as speaker 24C. In the example of FIG. 3, speaker 24C is a voice-controlled speaker or other electronic device having a speaker that plays audio to a surrounding environment. Speaker 24C may be a stand-alone speaker or may be a speaker that has been integrated into a wall, ceiling, furniture, infrastructure, television, computer, or other structure.

As shown in FIG. 3, device 24C may include a housing such as housing 76. Housing 76 may have a shape that is suited to the type of device 24C for which the housing is being used (e.g., housing 76 may have the shape of a portable speaker, the shape of a fixed speaker that is mounted to a wall or ceiling, the shape of an electronic device that includes a speaker, etc.).

In the illustrative example of FIG. 3, housing 76 has the shape of a portable speaker. Housing 76 may have a cylindrical shape that wraps around longitudinal axis 70 with rounded upper and lower ends, or may have any other suitable shape (e.g., a pyramidal shape, a conical shape, a frustoconical shape, a box shape such as a rectangular box shape, a spherical shape, etc.). Housing 76 may include support structures formed from metal, polymer, ceramic, glass, wood, other materials, and/or combinations of these materials.

If desired, device 24C may include fabric. For example, fabric may form all or part of a housing wall or other layer in an electronic device, may form the outermost layer of device 24C, may form one or more inner covering layers, may form internal structures in an electronic device, or may form other fabric-based structures. Device 24C may be soft (e.g., device 24C may have a fabric surface that yields to a light touch), may have a rigid feel (e.g., the surface of device 24C may be formed from a stiff fabric), may have a surface that is textured, that is smooth, that has ribs or other patterned textures, and/or may include portions formed from non-fabric structures of plastic, metal, glass, crystalline materials, ceramics, or other materials.

In an illustrative configuration, some or all of the upper surface of housing 76 such as portion 98 may be formed from rigid polymer, rigid glass, or other non-fabric structure and the sidewall surfaces of housing 76 may be covered with fabric (e.g., to create a cover layer for the sidewalls that is transparent to sound). Portion 98, which may sometimes be referred to as an upper housing wall or top cap, may be a disk. For example, portion 98 may be formed from a disk-shaped polymer or glass member with a slightly curved cross-sectional profile and a circular outline (e.g., portion 98 may form a slightly protruding dome shape or other suitable housing shapes). Portion 98 may be formed from transparent materials. The transparent materials may be translucent (hazy) or may exhibit low haze. The use of translucent material and/or other transparent material for portion 98 allows underlying light-emitting components in the interior of device 30 to emit light that passes through portion 98. For example, portion 98 may be formed from clear material, material with a neutral tint (e.g., dark polymer or glass that allows light to pass), or material with a non-neutral color (e.g., blue, red, etc.).

Portion 98 may overlap a touch sensor. For example, a two-dimensional capacitive touch sensor may be formed from an array of capacitive touch sensor electrodes that are overlapped by portion 98. Capacitive touch sensor circuitry may be coupled to the touch sensor electrodes and may gather user touch input through portion 98. The capacitive touch sensors may be formed directly on the inner surface of portion 98, which therefore serves as a substrate for the touch sensors, or may be formed on separate supporting structures (e.g., a separate polymer film or other separate substrate). Capacitive touch sensor electrodes may be formed from conductive material such as metal, transparent conductive material such as indium tin oxide, or other conductive materials. If desired, one-dimensional, two-dimensional, and/or three-dimensional sensors such as proximity sensors, optical touch sensors, force sensors, image sensors, time-of-flight sensors, vibration sensors such as accelerometers, and/or other sensors may be formed under portion 98 or other portions of housing 76 (e.g., instead of a two-dimensional capacitive touch sensor or in addition to a two-dimensional capacitive touch sensor). If desired, sensors may operate through fabric sidewalls or other housing structures.

Handheld electronic device 10 may operate as a stand-alone electronic device and/or may operate in conjunction with one or more of electronic devices 24A, 24B, 24C, and/or other electronic devices 24. When device 10 is operating as a stand-alone device, input-output functions may be handled entirely by device 10. Device 10 may gather user input (e.g., microphone 42 may detect voice commands, a touch sensor in display 44 may detect touch input, a button may detect button input, a motion sensor may detect gesture input, etc.) and may provide a user with output using speaker 40, display 44, haptic output devices 20, and/or other output devices in device 10. When device 10 is operating in conjunction with one or more electronic devices 24, input-output functions may be shared by device 10 and electronic device 24. For example, user input, sensor data, and/or location information gathered by one or more of devices 24A, 24B, and/or 24C may be conveyed to device 10, may be used to control device 10, and/or may result in output from device 10. Similarly, user input, sensor data, and/or location information gathered by device 10 may be conveyed to devices 24, may be used to control devices 24, and/or may result in output from devices 24.

Because device 10 is relatively small (e.g., small enough to fit in the hand of illustrative user 72) and may have a small display 44 (or may not have any display), a user may interact with device 10 primarily through audio input, gesture input, and/or sensor input, if desired. Input to display 44 may, however, be used to select a mode for device 10, select an application for device 10, to adjust settings on device 10, etc. Display 44 may display one or more icons 74 to indicate what mode or application is currently in use on device 10. For example, icon 74 may be an application icon (e.g., an icon representing a calculator application, a calendar application, a messaging application, an email application, a meditation application, a music streaming application, etc.), a picture, a photograph, text, a symbol, a letter, an emoji, an animoji, a solid color, a pattern, a logo, an avatar, a character from a movie, television show, or book, a user-chosen design, and/or any other suitable icon.

If desired, display 44 may display one icon at a time and the user can swipe left, right, up, or down to move through different icons until the desired application icon 74 is displayed on display 44. Additionally or alternatively, the user may provide a voice command indicating which application the user wishes to run on device 10.

When device 10 is operating in a particular mode or running a particular application, control circuitry 12 may process audio input to listen for commands that are specific to the mode or application currently in use. For example, control circuitry 12 may listen for calculator-related voice commands when the handheld electronic device is operated in calculator mode (e.g., when icon 74 is a calculator application icon), may listen for music-related voice commands when the handheld electronic device is operated in music mode (e.g., when icon 74 is a music application icon), may listen for weather-related commands when the handheld electronic device is operated in weather mode (e.g., when icon 74 is a weather application icon), etc.

In response to user input (e.g., voice commands, touch input, gesture input, etc.), sensor data, and/or location information, control circuitry 12 in device 10 may take suitable action such as providing output (e.g., visual output on display 44, audio output 86 from speaker 40, haptic output from haptic output device 20, etc.). For example, when a user selects a meditation application by providing appropriate touch input to display 44 and/or voice input to microphone 42, control circuitry 12 may launch the meditation application and may begin playing a guided meditation audio program from speaker 40 in device 10 or from speaker 46 in one or more of devices 24A, 24B, and 24C. When a user selects a news application by providing appropriate touch input to display 44 and/or voice input to microphone 42, control circuitry 12 may launch the news application on device 10 and may begin playing a news program from speaker 40 in device 10 or from speaker 46 in one or more of devices 24A, 24B, and 24C. When a user selects a calculator application by providing appropriate touch input to display 44 and/or voice input to microphone 42, control circuitry 12 may launch the calculator application on device 10 and may begin listening for calculator queries and may provide responses to the calculator queries from speaker 40 in device 10 or from speaker 46 in one or more of devices 24A, 24B, and 24C.

Audio output 86 from speaker 40 in device 10 may be audio feedback (e.g., a virtual assistant's voice responding to a user's voice command), may be music (e.g., music streaming from device 10 or streaming from one of electronic devices 24), and/or may be sound effects associated with other output being provided from device 10. For example, when a user provides a voice command requesting a current weather status, audio output 86 may include a rain sound, a thunder sound, or other weather-related sound effect to represent the current weather. The sound effect may be an actual recording (e.g., a sampled recording previously gathered by a microphone in device 10, a microphone in device 24, and/or a microphone in another electronic device) and/or may be a computer-generated sound effect.

In addition to or instead of launching applications on device 10, input to device 10 may be used to launch applications on one or more of devices 24A, 24B, and 24C. For example, When a user selects a calendar application on device 10 by providing appropriate touch input to display 44 and/or voice input to microphone 42, control circuitry 12 may send control signals to electronic device 24A and control circuitry 26 on device 24 may display the user's calendar on display 50. This allows the user to easily interact with different electronic devices 24 using a single device 10 that fits easily in the palm of the user's hand.

The mode that device 10 is operating in and/or the application that device 10 is currently running may be set or adjusted based on user input (e.g., voice commands, touch input, etc.), sensor data, and/or location information. For example, the handheld electronic device may automatically launch into remote control mode when approaching an external electronic device, may automatically launch into a museum application when entering a museum, may automatically launch into contactless payment mode when approaching a payment terminal, etc. Some of these examples are illustrated in FIGS. 4, 5, and. 6.

Figure 4:
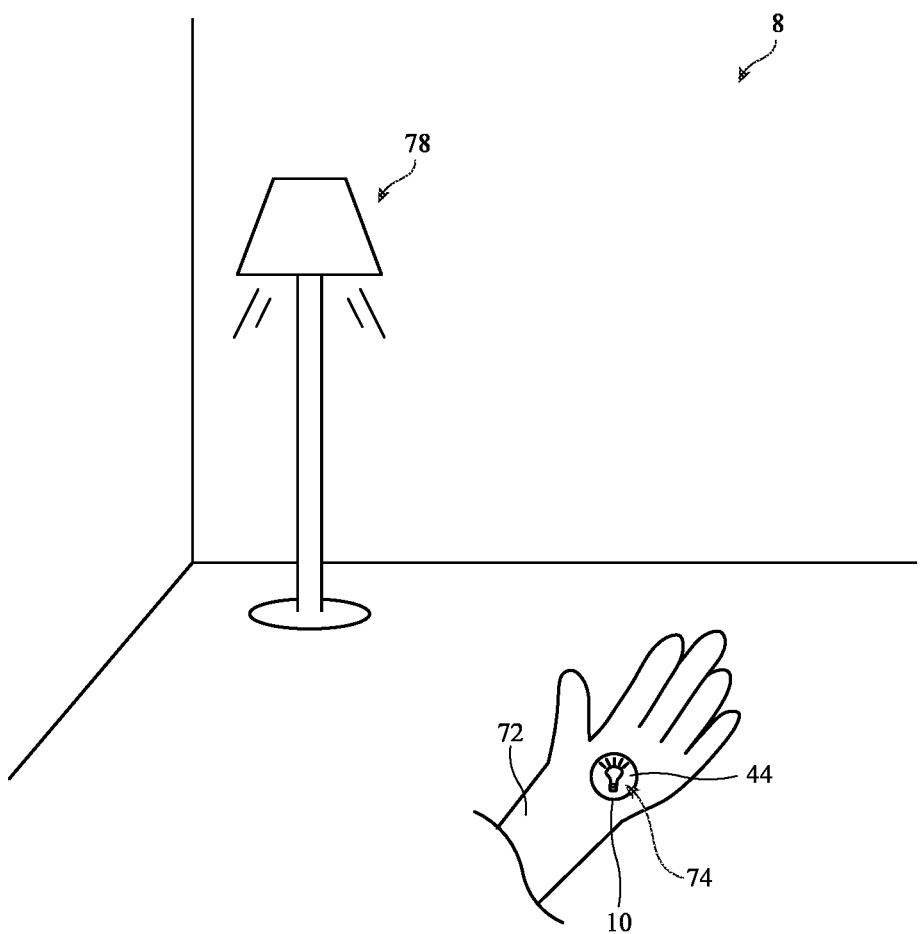
FIG. 4 is a diagram of an illustrative handheld electronic device being used as a remote control in accordance with an embodiment.
Figure 5:
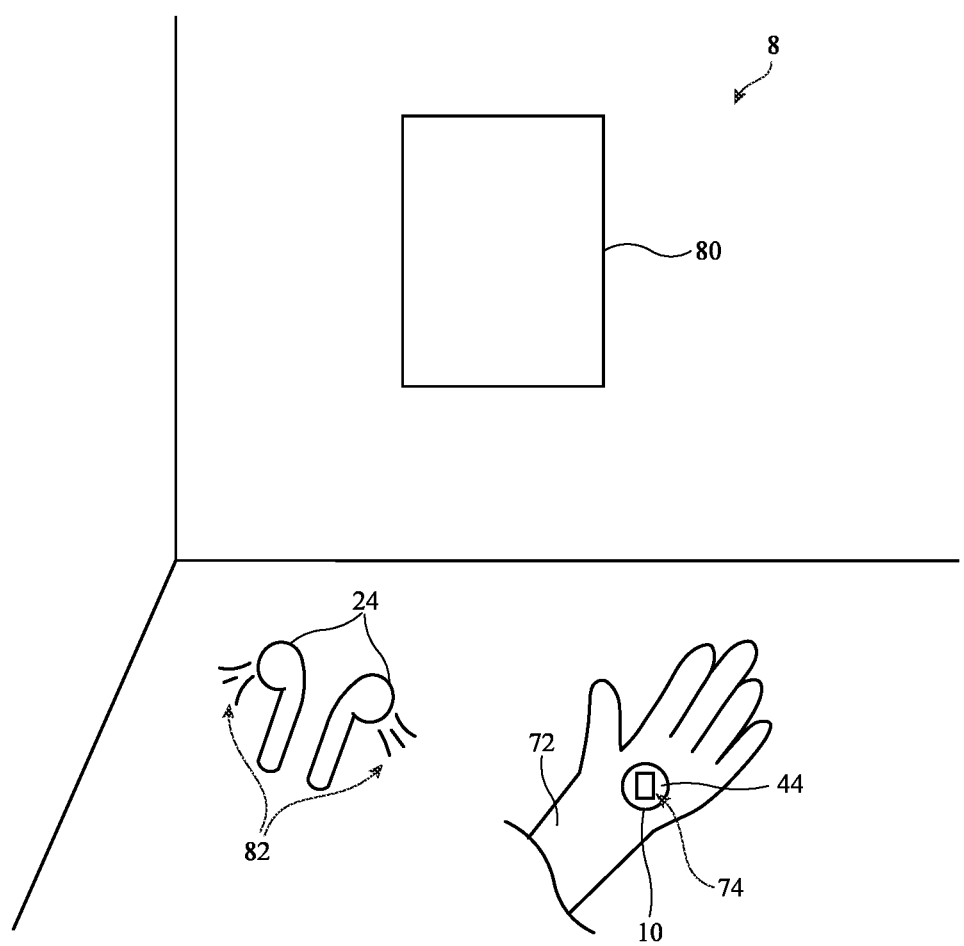
FIG. 5 is a diagram of an illustrative handheld electronic device being used in a museum to provide museum-related output to a user in accordance with an embodiment.

FIG. 4 shows an illustrative example in which device 10 is used as a remote control for external device 78. External device 78 may be one of devices 24, may be part of a vehicle dashboard or other equipment in a vehicle, may be mounted on a wall or other structure in a building, may be a thermostat, a household appliance, or other device in the home, may be a stand-alone computer such as a desktop computer, laptop computer, or tablet computer, may be embedded equipment in a kiosk, may be other equipment including control circuitry, may be portable equipment such as a cellular telephone, wristwatch, or other portable electronic device, may be a display or a display with an embedded computer, may be a television, may be a media playback device such as a speaker (e.g., a speaker with buttons, an internet connection, and a voice recognition interface, a speaker that forms part of an audio-visual system in a home or office, a countertop wireless speaker, etc.), may be networking equipment such as a router, access point, or switch, or may be other electronic equipment. In the example of FIG. 4, device 78 is a lamp.

When a user desires to control an aspect of device 78, the user may move device 10 into proximity of device 78. The distance between device 10 and device 78 may be determined using wireless positioning circuitry in device 10 and/or device 78 (e.g., ultra-wideband radio-frequency transceiver circuitry such as IEEE 802.15.4 transceiver circuitry), may be determined using light-based or radio-frequency-based proximity sensor circuitry, may be determined using near-field communications circuitry, and/or may be determined using magnetic sensors, acoustic sensors, light sensors, cameras, and other sensors and circuits in system 8. If desired, wireless positioning circuitry and other circuitry for determining the position of device 10 relative to device 78 may include wireless equipment that emits beacons and other wireless signals and/or other wireless equipment. Wireless equipment in system 8 may be included in device 10, device 78, and/or other devices.

In response to determining that device 10 is in proximity to device 78 (e.g., within a given threshold distance of device 78), control circuitry 12 may direct display 44 to display a user interface for controlling or otherwise communicating with device 78. In the example of FIG. 4 in which device 78 is a lamp, display 44 may display brightness controls for controlling the brightness of the lamp, may display on/off controls for turning the lamp on or off, may display color controls for adjusting the color temperature of the illumination from the lamp, etc. In general, any suitable user interface elements for controlling an external device such as device 78 may be displayed on display 44. The displayed user interface elements may include, for example, selectable on-screen options. A user can tap on a desired option or can provide other input to device 10 (e.g., voice input, gesture input, etc.) to control the operation of device 78. In response to the user input, control circuitry 12 may use communications circuitry 14 to send corresponding control signals to device 78 to adjust the operation of device 78 based on the user input.

FIG. 5 illustrates an example in which location information detected by device 10 triggers audio content associated with the location of device 10. For example, user 72 may use device 10 as a way of receiving content associated with a user's current location such as content associated with a museum, a school, a gym, an auditorium, a conference, an airport, a building, a park, or any other suitable location. Control circuitry 12 in device 10 may monitor the current location of device 10 (e.g., using GPS receiver circuitry, ultra-wideband receiver circuitry, and/or other location tracking circuitry) to determine when device 10 is in a location that might have associated audio content available for the user. For example, when control circuitry 12 determines that device 10 is currently located in a museum, control circuitry 12 may search the internet over a wireless connection for audio content associated with the museum (e.g., audio content with information about different exhibits in the museum, information about how to navigate the museum, information about upcoming events at the museum, etc.). Upon detecting available audio, device 10 may automatically start playing the audio (e.g., through the user's headphones 24 as audio 82 and/or from device 10), or device 10 may automatically prompt the user with an option to listen to the available audio.

Control circuitry 12 may continue to monitor the position of device 10 as user 72 moves through the building and may, if desired, update or change the audio 82 based on the user's location 72 within the building. For example, control circuitry 12 may detect when device 10 is in proximity to (e.g., within a given threshold distance of) exhibit 80. In response to detecting that device 10 is in proximity to exhibit 80, control circuitry 12 may automatically being providing information about exhibit 80 using speaker 40 in device 10 and/or using speaker 46 in device 24 (e.g., as audio output 82). If desired, visual output on display 44 may also be provided based on the location of device 10 within the museum. For example, icon 74 may be an image of the exhibit 80 that user 72 is currently viewing at the museum.

Figure 6:
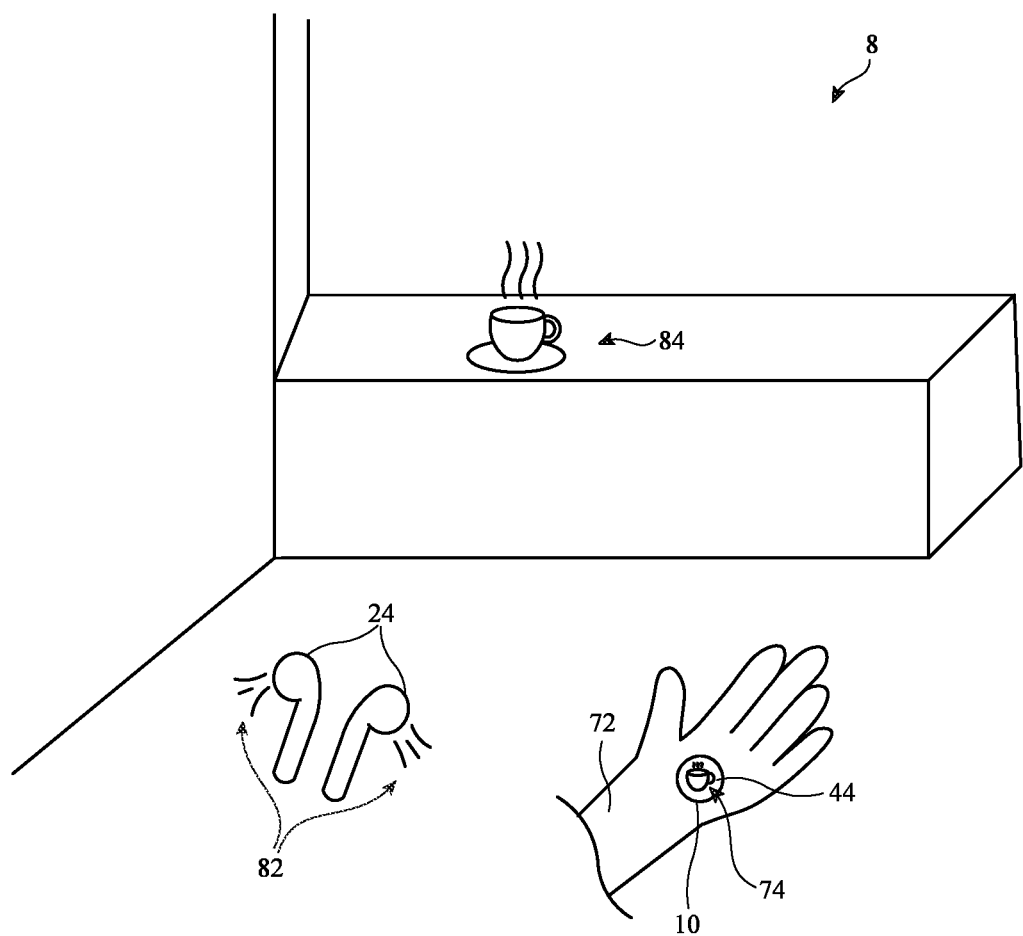
FIG. 6 is a diagram of an illustrative handheld electronic device being used to provide notifications associated with a purchase in accordance with an embodiment.

FIG. 6 illustrates another example in which location information detected by device 10 triggers purchase-related output associated with the location of device 10. For example, user 72 may use device 10 as a way of receiving interacting with a place of business such as a café, a restaurant, a retail shop, or any other suitable location. Control circuitry 12 in device 10 may monitor the current location of device 10 (e.g., using GPS receiver circuitry, ultra-wideband receiver circuitry, and/or other location tracking circuitry) to determine when device 10 is in a location that might have associated purchase-related content available for the user. For example, when control circuitry 12 determines that device 10 is currently located in a coffee shop, control circuitry 12 may search the internet over a wireless connection for content associated with the coffee shop (e.g., control circuitry 12 may download an application or visit a website through which the user can purchase items from the coffee shop, receive updates on the user's order, receive promotional deals, etc.). Upon detecting available content, device 10 may automatically start providing output associated with the content. For example, icon 74 on display 44 may be updated to an image of a coffee cup to notify the user that coffee 84 is ready for pick-up (e.g., when the application or website associated with the coffee shop indicates that the user's order is ready). If desired, device 10 may also provide audio output associated with the user's purchase at the location (e.g., an audible alert that the user's coffee is ready, other purchase-related alerts, etc.). The audio may include audio output from device 10 and/or audio output 82 from device 24.

Figure 7:
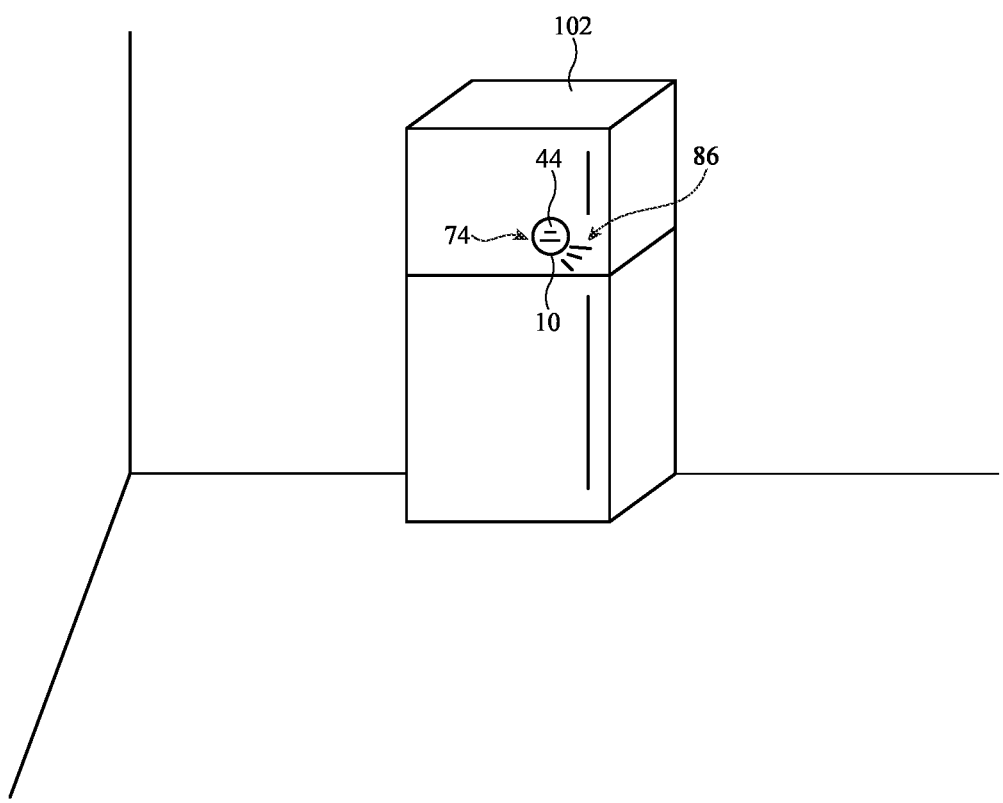
FIG. 7 is a diagram of an illustrative handheld electronic device being used to edit a grocery list in accordance with an embodiment.
Figure 8:
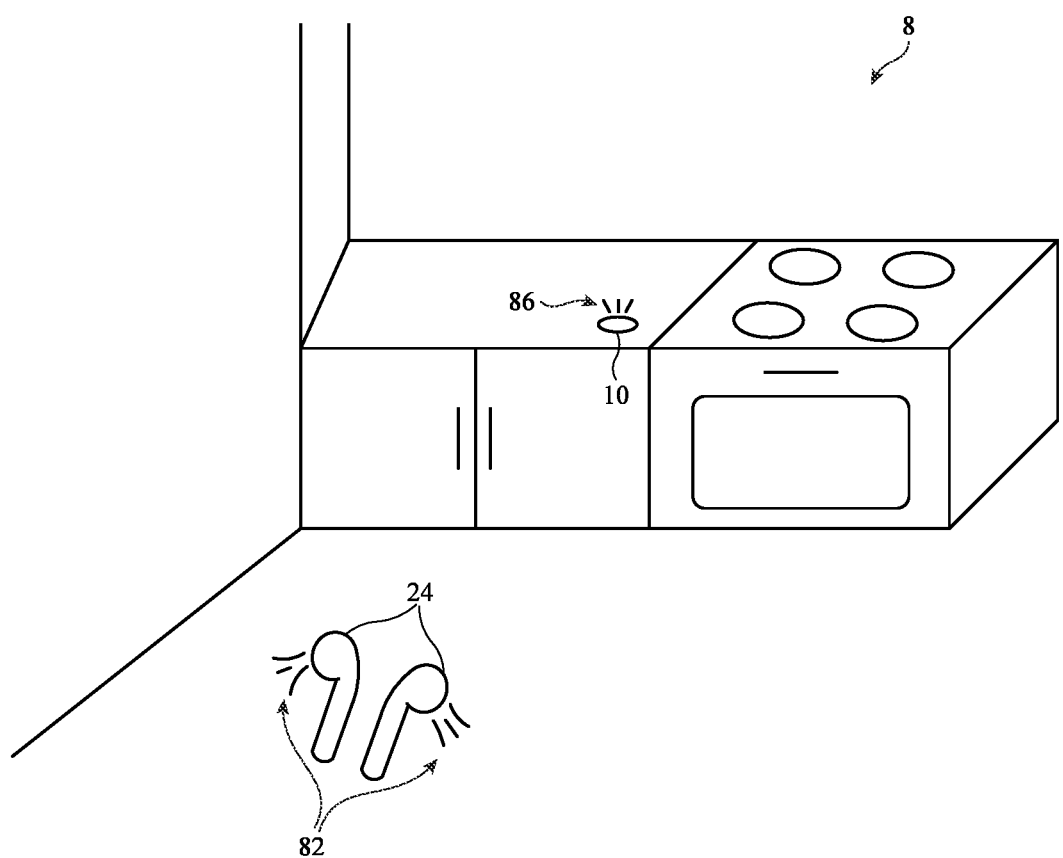
FIG. 8 is a diagram of an illustrative handheld electronic device being used to set a timer in accordance with an embodiment.

FIGS. 7 and 8 show illustrative examples in which device 10 is placed in a stationary location around the user's home. For example, as shown in FIG. 7, device 10 may be placed on a refrigerator 102 or other home appliance. The user may provide voice commands, touch input, and/or other user input to device 10. In response, device 10 may provide audio output 86, visual output on display 44, haptic output, and/or other associated output.

Device 10 may, for example, be used to create, update, and maintain one or more lists such as a grocery list. When the user wishes to add an item to a grocery list, the user may provide voice commands to device 10 on refrigerator 102. If desired, audio output 86 may be used to confirm that the desired item has been added to the grocery list. In this way, device 10 may serve as a voice-controlled assistant that can be placed in convenient locations such as refrigerator 102 due to its compact size.

FIG. 8 illustrates an example in which device 10 has been placed on a kitchen countertop. The user may provide voice commands, touch input, and/or other user input to device 10. In response, device 10 may provide audio output 86, visual output on display 44, haptic output, and/or other associated output.

Device 10 may, for example, be used to set a timer. When the user wishes to set a timer (e.g., a cooking timer), the user may provide voice commands to device 10 on the kitchen counter. If desired, audio output 86 from device 10 and/or audio output 82 from device 24 may be used to confirm that the desired timer has been set and/or to alert the user when the timer is done. If desired, device 10 may be placed in other locations (e.g., other locations around a home, office, car, etc.) to provide voice-controlled assistant functions in any location that is convenient for the user.

Figure 9:
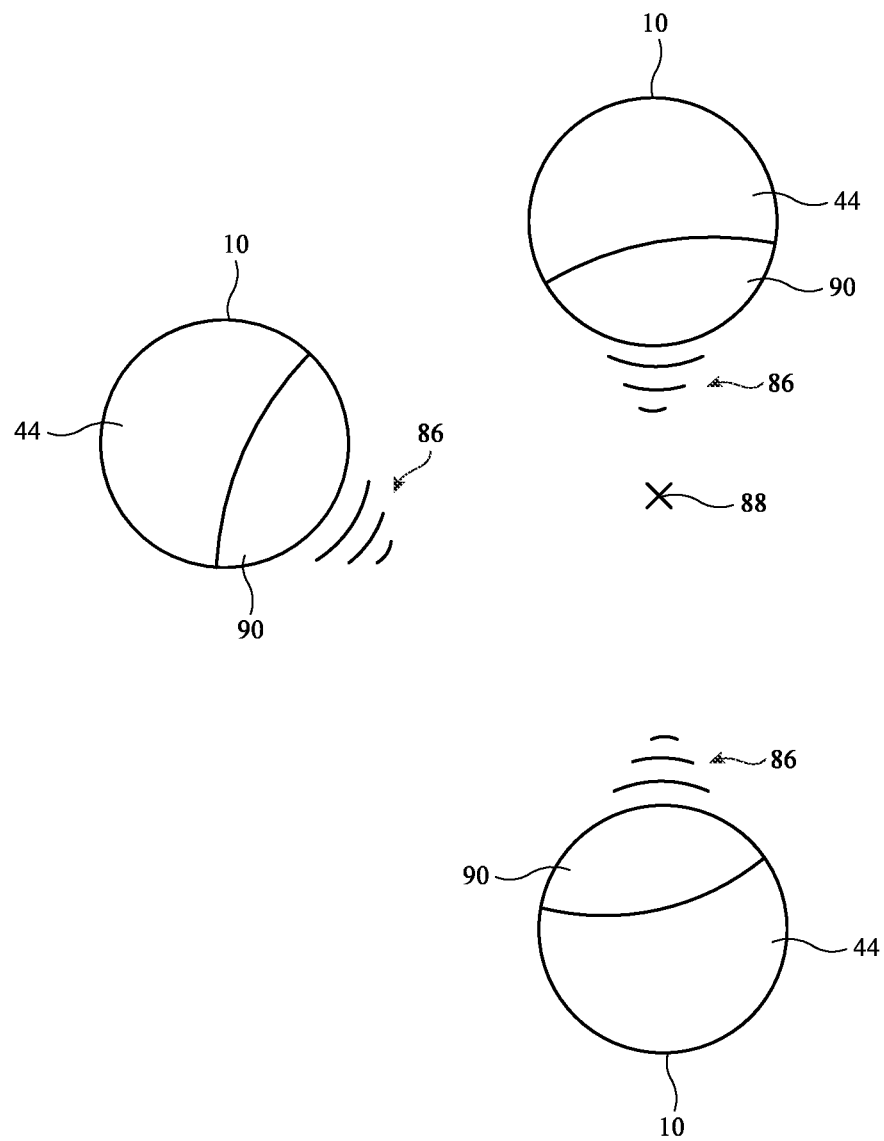
FIG. 9 is a diagram of multiple handheld electronic devices providing output based on the relative locations of one another in accordance with an embodiment.

FIG. 9 is a diagram illustrating how devices 10 may provide output that is based on the locations of one or more other nearby devices 10. Control circuitry 12 in each device 10 may determine the relative locations of other devices 10 using wireless communications circuitry (e.g., ultrawide-band radio-frequency transceiver circuitry such as IEEE 802.15.4 transceiver circuitry), using light-based or radio-frequency-based proximity sensor circuitry, using near-field communications circuitry, and/or using magnetic sensors, acoustic sensors, light sensors, cameras, and other sensors and circuits in system 8. When devices 10 are providing coordinated visual output via displays 44 and/or coordinated audio output via speakers 40 to a user in location 88, control circuitry 12 in each device 10 may adjust the visual output on display 44 and/or the audio output from speaker 40 based on the locations of other devices 10 and/or based on the location of the user. For example, if multiple devices 10 are streaming the same song to a user in location 88, each device 10 may direct its audio output 86 towards location 88 (e.g., using beamforming techniques) with one device 10 providing left channel audio and another device 10 providing right channel audio to create a stereo audio experience at location 88. Visual elements 90 on display 44 may be visual indicators of the locations of other devices 10 and/or may be other display elements that are positioned on display 44 based on the locations of other devices 10.

Figure 10:
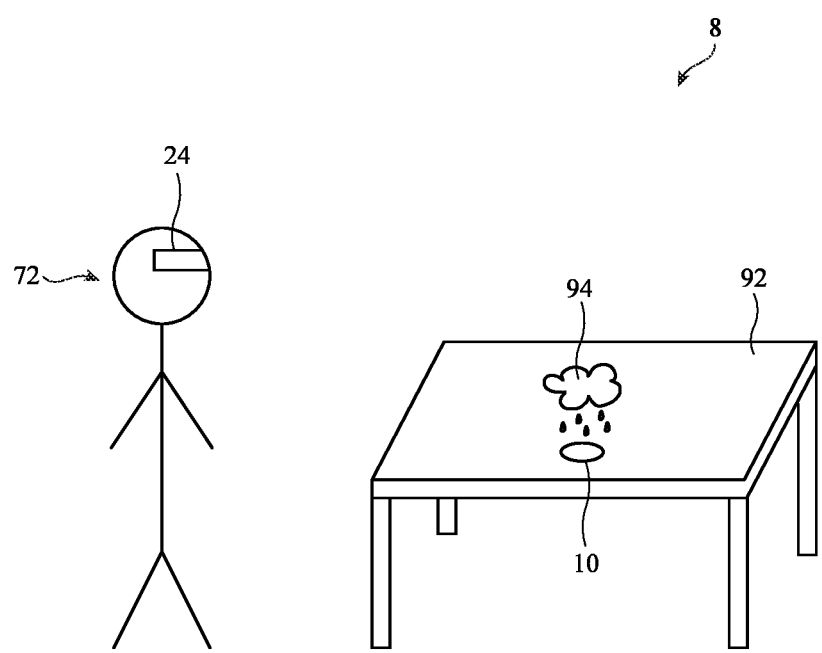
FIG. 10 is a diagram of an illustrative handheld electronic device being used as a marker in a virtual reality system in accordance with an embodiment.
Figure 11:
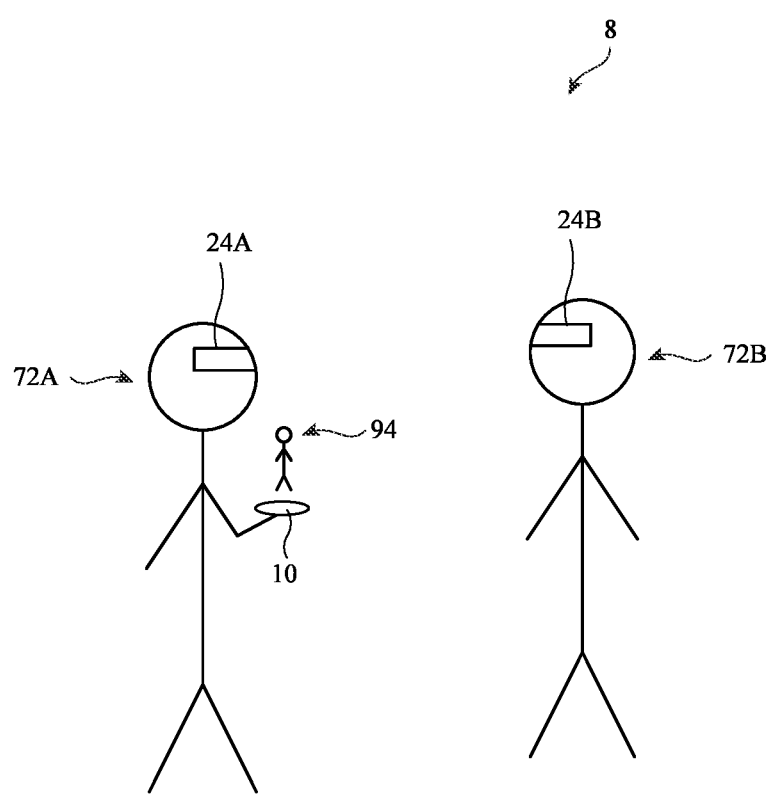
FIG. 11 is a diagram of an illustrative handheld electronic device being used as a marker in a virtual reality system during a video call in accordance with an embodiment.
Figure 12:
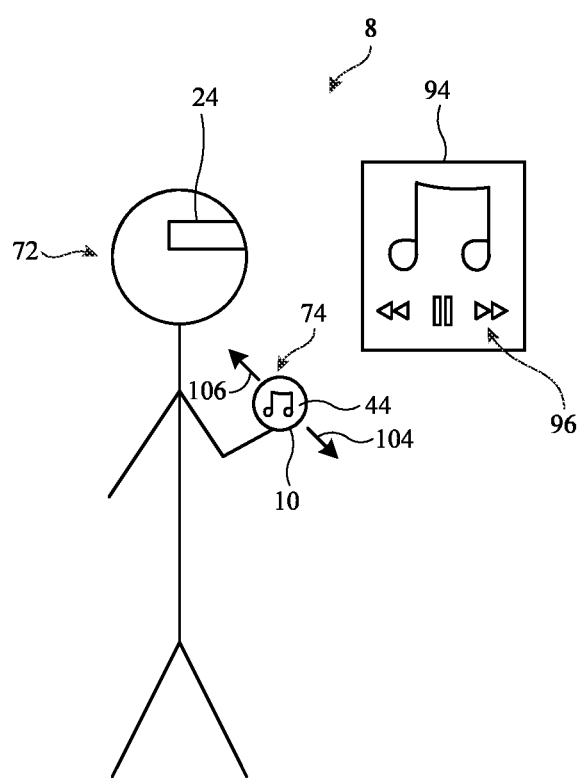
FIG. 12 is a diagram of an illustrative handheld electronic device being used as a marker and an input device in a virtual reality system in accordance with an embodiment.

FIGS. 10, 11, and 12 show illustrative examples in which device 10 is used as a marker or anchor in a virtual reality, augmented reality, and/or mixed reality system. When device 10 is used as an anchor, device 24 (e.g., a head-mounted device or any other suitable virtual reality, augmented reality, and/or mixed reality electronic device) may map out an environment (or may receive and/or store information about a previously mapped out environment) using a virtual coordinate system that is anchored by device 10. Device 24 may determine the location of other objects (e.g., other devices 24, other devices 10, etc.) based on the location of device 10.

In arrangements where device 10 is used as a visual marker, device 10 may include one or more features (e.g., graphic 74, physical surfaces features, infrared-reflective ink features, visible ink features, etc.) that may be detected by a camera in device 24 (e.g., an infrared camera, a visible light camera, or other suitable camera). The markers on device 10 may help inform system 8 of the location of device 10, the location of a virtual work surface, the location of a virtual game surface, the location of a virtual input-output surface, and/or the location of a user's hands or other body part as the user is interacting with a virtual object, a real-world object, a computing device, or other objects in system 8.

As shown in FIG. 10, for example, device 10 may be used to form a virtual reality, augmented reality, and/or mixed reality environment on real-world surface 92 (e.g., a table or other real-world surface). One or more electronic devices 24 in system 8 such as head-mounted device 24 of FIG. 10 may be used to track the location of device 10 and to display virtual images on surface 92 based on the location of device 10. For example, circuitry 26 of device 24 may display virtual image 94 on surface 92 based on the position of device 10. Virtual image 94 may be any suitable virtual image (e.g., a three-dimensional image corresponding to the weather, an emoji, a symbol, a letter, a shape, etc.). Virtual image 94 may be static (e.g., fixed), may be animated (e.g., moving), may be computer-generated, and/or may be captured images from a camera in device 10 and/or device 24. If desired, the virtual image 94 produced by device 24 may be based on the application running on device 10 and/or the task being performed by device 10. For example, when user 72 says "weather" to device 10 and/or device 24, device 24 may display a virtual representation of the weather over device 10. Audio effects such as thunder and rain sounds may be provided from speaker 40 in device 10 and/or from speaker 46 in device 24. In general, any suitable virtual image 94 may be displayed over device 10 during use of device 10 and device 24 (e.g., calculator-related images when device 10 is being used for calculator functions, calendar-related images when device 10 is being used for calendar functions, remote control interface images when device 10 is being used for remote control functions, museum or other location-related images when device 10 is being used in a particular location such as a museum, etc.).

FIG. 11 shows how device 10 may be used as a marker in a virtual reality system during a video call. In this example, user 72A is wearing device 24A and is conducting a video call using device 24A and device 10. Real-time video associated with the video call (e.g., live video of the person with whom user 72A is speaking) may be displayed as virtual image 94 over device 10, using device 10 as an anchor for virtual image 94.

The compact size and lightweight housing of device 10 allows user 72A to easily hold device 10 in his or her hand during the video call. User 72A can walk around while on the video call and still remain at the desired distance from virtual image 94. If desired, images captured by one or more cameras in device 10 may played on the video call for viewing by the other party on the video call. For example, user 72A may provide voice input, touch input, or other suitable user input to device 10 and/or to device 24A to initiate sharing of a live video feed being captured by a camera in device 10. In this way, user 72A may move device 10 around to show the person that user 72A is talking to what user 72A is currently seeing.

Privacy settings on device 10 and/or device 24A may be adjusted by user 72A to determine when virtual image 94 is viewable by other users such as user 72B with device 24B (e.g., a head-mounted device similar to device 24A). When public viewing is enabled (or when user 72A otherwise adjusts settings on device 10 and/or device 24A to allow one or more other persons to view virtual content), user 72B may be able to view virtual image 94 on device 10 using device 24B. When public viewing is disabled, user 72B may be unable to view virtual image 94 on device 10 using device 24B.

In the example of FIG. 12, device 10 is used as a controller in a virtual reality environment. For example, device 24 may display virtual image 94 using device 10 as an anchor or marker. User 72 may move device 10 as a way of providing input to virtual image 94. For example, when device 10 is being used to listen to music, device 24 may display virtual image 94 with media playback controls 96. Control circuitry 12 may use motion sensors in device 10 to detect a user's gestures with device 10, which may in turn be interpreted as input to media playback controls 96 in virtual image 94. Upon detecting gesture input, device 10 may provide corresponding control signals to a speaker in device 10, device 24, or other device that is playing audio for the user. For example, movements of device 10 in direction 106 may be interpreted as a user's selection of a previous track button in virtual control interface 96. Movements of device 10 in direction 104 may be interpreted as a user's selection of a next track button in virtual control interface 96. Gestures may be interpreted differently depending on the application currently being used on device 10 and/or device 24. For example, device 10 may be used as a gaming controller in a virtual reality game that is being played on device 24, may be used as a controller for device around the home (e.g., image 94 may be a virtual control interface for lamp 78 of FIG. 4 or other device), etc.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A handheld electronic device, comprising:
   a housing having a lateral dimension smaller than 50 mm;
   an ultra-wideband radio frequency signal transmitter;
   a sensor that receives user input;
   a display mounted in the housing;
   a speaker mounted in the housing; and
   control circuitry configured to:
      determine a location of the handheld electronic device;
      automatically provide content based on the location of the handheld electronic device, wherein the content comprises at least one of image content on the display and audio content from the speaker, wherein the control circuitry is configured to determine the location of the handheld electronic device relative to an external device, wherein the image content comprises a control interface for the external device, and wherein the control circuitry displays the control interface on the display in response to determining that the handheld electronic device is within a threshold distance of the external device; and
      send control signals to the external device in response to the user input.

2. The handheld electronic device defined in claim 1 further comprising a motion sensor.

3. The handheld electronic device defined in claim 1 wherein the sensor comprises a motion sensor and the user input comprises gesture input.

4. The handheld electronic device defined in claim 1 wherein the sensor comprises a touch sensor and the user input comprises touch input.

5. The handheld electronic device defined in claim 1 wherein the sensor comprises a microphone and the user input comprises voice input.

6. The handheld electronic device defined in claim 1 wherein the audio content comprises audio content associated with the location of the handheld electronic device.

7. The handheld electronic device defined in claim 1 wherein the external device is a head-mounted device.

8. The handheld electronic device defined in claim 7 further comprising:
   a visual marker configured to be tracked by the head-mounted device, wherein the control circuitry is configured to send signals to the head-mounted device based on the location of the handheld electronic device relative to the head-mounted device.

9. The handheld electronic device defined in claim 7 further comprising a camera that captures video during a video call on the head-mounted device.

10. The handheld electronic device defined in claim 8 further comprising a microphone configured to detect a voice command, wherein the signals are based on the voice command.

11. The handheld electronic device defined in claim 8 further comprising:
    a motion sensor that detects gesture input, wherein the signals are based on the gesture input.

12. A handheld electronic device, comprising:
    a housing having a lateral dimension smaller than 50 mm;
    a display mounted in the housing, wherein the display is configured to display a first icon in a first mode of operation and a second icon in a second mode of operation;
    a microphone configured to detect voice commands;
    a speaker mounted in the housing; and
    control circuitry configured to:
       listen for a first set of voice commands in the first mode of operation and listen for a second set of voice commands in the second mode of operation, wherein the first set of voice commands is different from the second set of voice commands;
       determine a location of the handheld electronic device within a building; and
       adjust output from at least one of the display and the speaker based on the location of the handheld electronic device within the building.

13. The handheld electronic device defined in claim 12 wherein the speaker provides sound effects in response to the voice commands.

14. The handheld electronic device defined in claim 12 wherein the handheld electronic device is configured to operate as a remote control for an external device and wherein the control circuitry is configured to identify remote control commands in the voice commands.

15. The handheld electronic device defined in claim 12 further comprising a motion sensor that detects gesture input.

16. The handheld electronic device defined in claim 12 wherein the housing and the display are circular.

* * * * *